United States Patent

Bühler

[11] Patent Number: 6,034,502
[45] Date of Patent: Mar. 7, 2000

[54] METHOD FOR CONTROLLING A CONTINUOUS ROTATION MINIATURE MOTOR

[75] Inventor: Roger Bühler, Le Locle, Switzerland

[73] Assignee: Asulab S.A., Bienne, Switzerland

[21] Appl. No.: 09/097,163

[22] Filed: Jun. 16, 1998

[30] Foreign Application Priority Data

Jun. 24, 1997 [CH] Switzerland ............... 1526/97

[51] Int. Cl.[7] .............. H02P 5/17; G04C 3/16; G04C 15/00
[52] U.S. Cl. ............ 318/700; 368/217; 318/254
[58] Field of Search .................. 318/138, 254, 318/439, 459, 500, 685, 696, 700, 701; 388/928.1; 368/85, 86, 87, 217, 218, 219

[56] References Cited

U.S. PATENT DOCUMENTS

| 4,704,566 | 11/1987 | Hirano et al. | 318/254 |
| 4,961,038 | 10/1990 | MacMinn | 318/696 |
| 5,200,684 | 4/1993 | Fisher | 318/809 |
| 5,485,072 | 1/1996 | Fehringer | 318/723 |

FOREIGN PATENT DOCUMENTS

| 619642 | 10/1994 | European Pat. Off. |
| 458380 | 10/1913 | France. |
| 981246 | 5/1951 | France. |
| 79372 | 10/1962 | France. |
| 2070636 | 9/1971 | France. |
| 2076493 | 10/1971 | France. |
| 1940637 | 2/1971 | Germany. |
| 9203655 | 8/1992 | Germany. |
| 1459434 | 12/1976 | United Kingdom. |

Primary Examiner—Bentsu Ro
Attorney, Agent, or Firm—Sughrue, Mion, Zinn, Macpeak & Seas, PLLC

[57] ABSTRACT

The invention concerns a method for controlling a continuous rotation miniature motor including a rotor carrying permanent magnets and a stator carrying at least one coil in which an alternating induced voltage is generated when the rotor rotates, this method consisting in maintaining the rotation of said rotor by successive pulses (102) supplied, in respective half periods of the induced voltage ($U_i$), before the induced voltage reaches a maximum absolute value in each of these half periods. In particular, the time interval ($t_1$) between a passage through zero of the induced voltage and the beginning of a maintenance pulse (102), provided in the half period following said passage through zero, is constant.

6 Claims, 3 Drawing Sheets

METHOD FOR CONTROLLING A CONTINUOUS ROTATION MINIATURE MOTOR

The present invention concerns a method for controlling a continuous rotation miniature motor. In particular, this miniature motor is intended to be used in a timepiece. The miniature motor controlled by the method according to the invention is preferably of the type with permanent magnet(s) carried by the rotor and with fixed winding(s) carried by the stator.

In a first embodiment of the miniature motor, three stator windings are provided for driving the rotor, whereas in a second embodiment, only two windings are provided for driving the motor, said windings being disposed opposite each other relative to the rotor shaft. Each of these two embodiments has its own advantages which will be described in more detail hereinafter.

In a particular embodiment of the miniature motor, the rotor includes two oblong magnetic flanges and four bipolar magnets situated respectively in the four end regions of the two flanges arranged facing each other. This rotor essentially defines a single main magnetic circuit. The totality of the mass driven in rotation, with the exception of the shaft and possibly a carrying structure, is used for the magnetic operation of the miniature motor. The magnetic coupling between the permanent magnets of the rotor and the stator windings is particularly good in this embodiment.

According to a particular feature, a bipolar rotor positioning magnet is provided at the periphery of the miniature motor, used for maintaining the rotor in a predefined angular position when the latter is at rest. As a result of this feature, it is possible to assure the efficient starting of the rotor's rotation in the required direction of rotation.

An object of the present invention is to provide a method for controlling a continuous rotation miniature motor which is efficient and allows rotational stability to be assured without requiring sophisticated enslavement.

The present invention therefore concerns a method for controlling a continuous rotation miniature motor including a rotor carrying permanent magnets and a stator carrying at least one coil electrically connected to control and supply means, said permanent magnets being arranged radially on said rotor with respect to said coil so that the rotation of said rotor generates in the coil a variable induced voltage defining an alternating induced voltage curve as a function of time, this method being characterised in that the rotation of said rotor is maintained by successive pulses supplied, in respective half periods of said induced voltage curve, before the induced voltage reaches a maximum absolute value in each of these half periods.

As a result of these features, self-regulation of the rotational speed is obtained.

According to particular advantageous features of the invention, the time interval between a passage through zero of the induced voltage curve, defining the beginning of any half period, and the beginning of a maintenance pulse, provided in said half period, is constant and determined so that said maintenance pulse appears before the induced voltage reaches said maximum value in said half period for a given reference rotational speed.

According to other particular features of the invention, the duration of the maintenance pulses is variable, in particular as a function of the load applied to the miniature motor or of a detected deviation between the angular position of the rotor and a reference angular position determined by the control means.

The present invention will be described in more detail with the aid of the following description, made with reference to the annexed drawings, given by way of non-limiting examples, in which:

BRIEF DESCRIPTION OF THE DRAWINGS

With reference to FIGS. 1 and 2, an alternative embodiment of a continuous rotation miniature motor will be described hereinafter. In a plane perpendicular to axis of rotation 14, flanges 36 and 38 of rotor 34 have an oblong shape whose two end regions 10 and 12 have a semicircular external contour, the four bipolar magnets carried by the rotor having a circular shape. Central axis 40 of each of the three flat windings 26, 27 and 28 is not the same as axis 42 defined by the magnetic axes passing through the centres of gravity of the four bipolar magnets 16' and 18'. In order to increase, for given dimensions of rotor 34, the dimensions of flat windings 26, 27 and 28, central axis 40 of the windings is situated at a greater distance from axis of rotation 14 than axis 42 defined hereinbefore. In another alternative, these two axes are the same.

Figure 1:
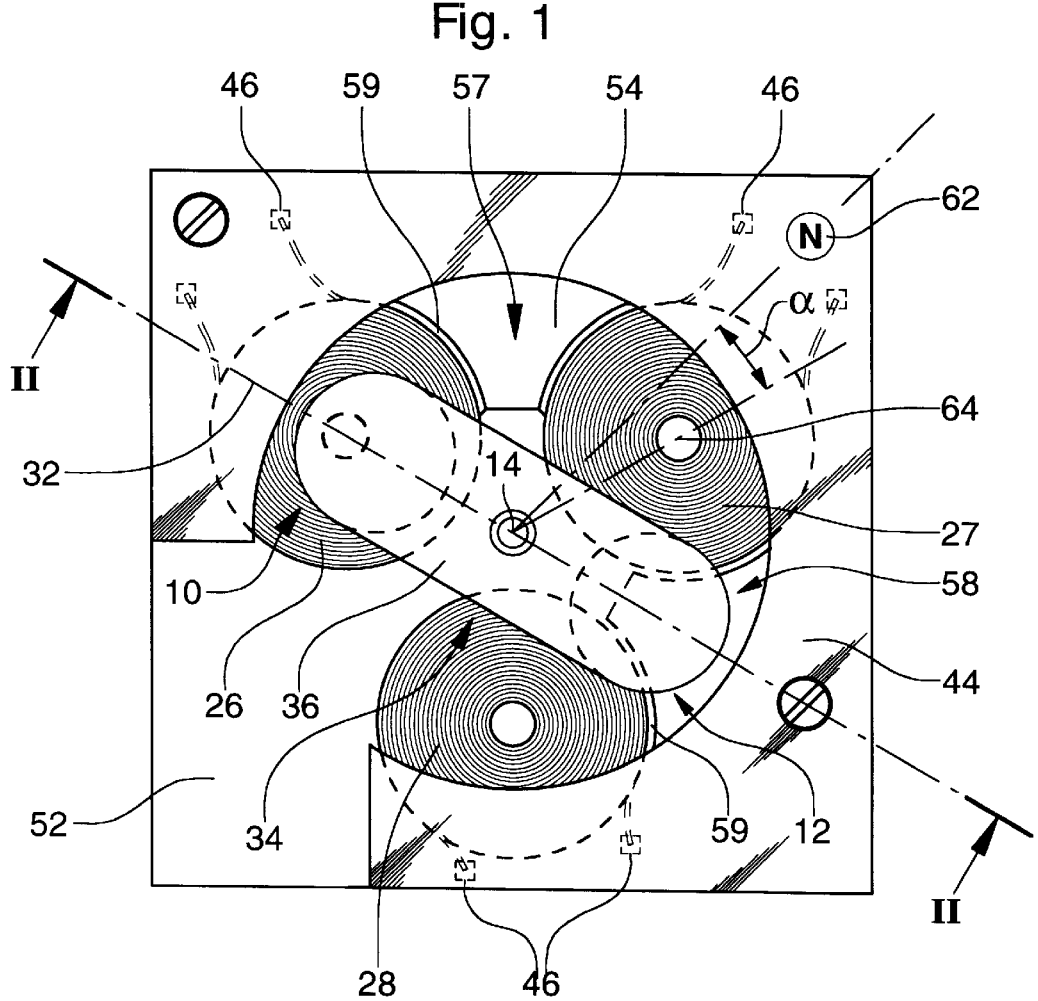
FIG. 1 is a top view of an embodiment of a continuous rotation miniature motor.
Figure 2:
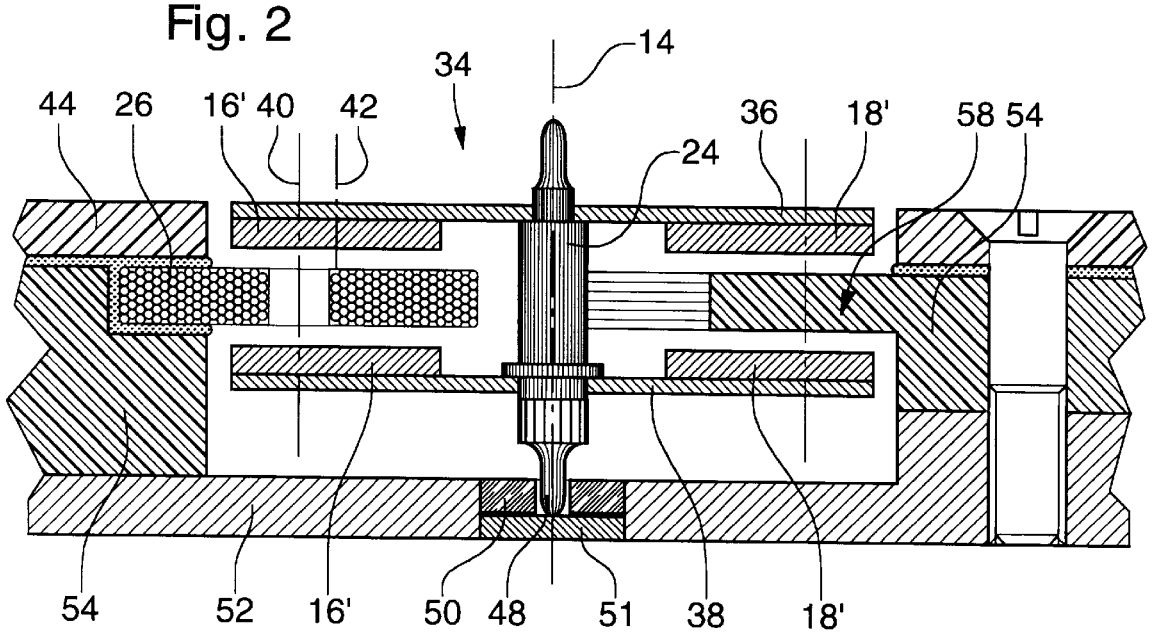
FIG. 2 is a cross-sectional view along the line II—II of FIG. 1.

As regards flat windings 26, 27 and 28, the determined optimum value ranges are as follows: Radius of each winding between 1 mm and 4 mm; height between approximately 0.4 mm and 1 mm; thickness of the conductive wire forming the winding between approximately 10 $\mu$m and 20 $\mu$m. The gap provided between the coils and the magnets has a value of approximately 0.2 mm in order to assure easy assembly and reliable operation. However, these values are not limiting.

Moreover, given that the energy consumption per unit of time is substantially proportional to the number of revolutions per second effected by rotor 34, it is preferable to have a relatively low rotor angular rotational speed, said speed being preferably comprised in the range 1 to 10 revolutions per second. However, as tests and simulations have shown, account must be taken of perturbations and shocks able to disturb the operation of the miniature motor and in particular the deceleration which such perturbations and shocks can cause. Thus, the minimum speed provided for a given motor must take account of such perturbation or shock situations. For example, for miniature motors whose external radius is between 5 mm and 10 mm, an angular rotational speed of around 5 revolutions per second gives excellent results as regards the electric consumption and operating reliability of such a miniature motor.

In order to position and hold in place flat windings 26, 27 and 28, these latter are partially fixed onto a printed circuit 44 on which electric conduction paths are provided certain of which end on electric connection pads 46 at the ends of the windings.

One of the two pivots 48 of central shaft 24 is mounted in a bearing 50 provided in a plate 52. A counter-pivot 51 is provided in this embodiment. Between plate 52 and printed circuit 44 is provided an intermediate part or strut 54, which is glued to printed circuit 44 and fixed to plate 52 by means of screws or other fixing means known to those skilled in the art.

Strut 54 has three circular hollows or recesses which are partially occupied by the three windings 26, 27 and 28. These recesses are filled with an adhesive material used for rigidly fixing the coils or flat windings, which are held between printed circuit 44 and strut 54. Strut 54 is also used to define the axial positioning of the windings. It will also be noted that strut 54 has two projecting portions 57 and 58 situated in the vicinity of the windings and having a height substantially equal to said windings. These portions 57 and 58 are also used for positioning and holding the flat windings by means of a bonding material 59 provided between these portions 57 and 58 and a portion of the lateral surface of the windings. However, the presence of portions 57 and 58 is not indispensable to hold the coils rigidly within the scope of the present construction.

Central shaft 24 can be made of magnetic material or of non-magnetic material, in particular of light, rigid non-magnetic material. Given that losses via friction are primarily responsible for the electric consumption of the miniature motor, those skilled in the art will take particular care in mounting central shaft 24 in the bearings intended to accommodate the pivots of said central shaft. In particular, it is possible to provide ball bearings with minimum contact surfaces between central shaft 24 and the bearings in which it is mounted. Next, lubrication of said bearings can be significant and those skilled in the art know self-lubricating materials which can be advantageous. In the case of the alternative described here, the contact surfaces between shaft 24 and bearing 50 are reduced to the minimum in particular by reducing the diameter of the pivots and the lateral contact surface.

Figure 3:
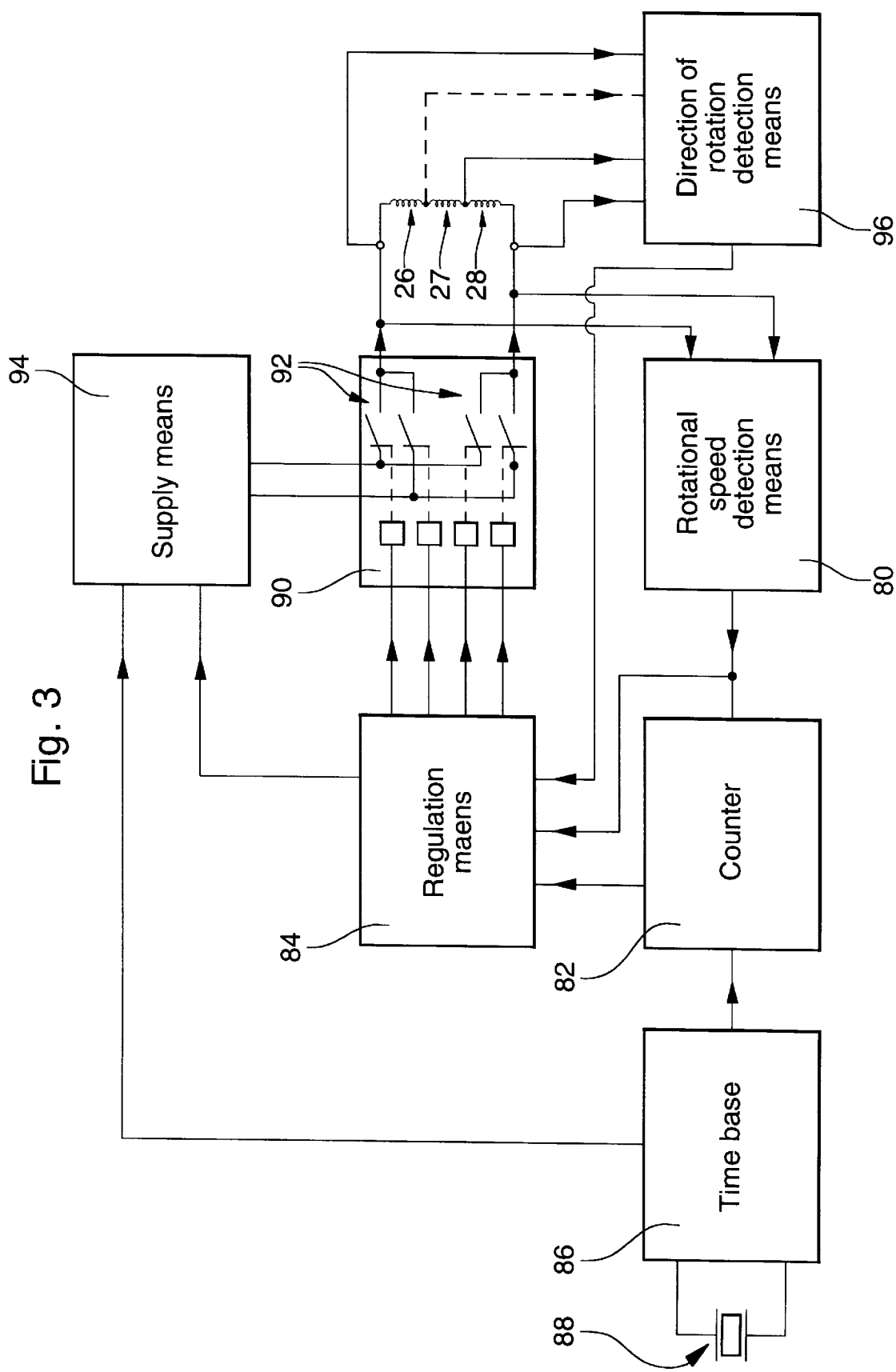
FIG. 3 is a diagram of an embodiment of a continuous rotation miniature motor control arrangement.

FIG. 3 describes a control circuit for the miniature motor described hereinbefore. The three flat windings 26, 27 and 28 are electrically connected in series. These three windings are arranged about axis of rotation 14 in a regular manner with an angular shift of 120°. Given the arrangement of the flat windings and the rotor, in particular the bipolar magnets, the rotation of the rotor generates an induced signal whose period corresponds to a rotation of the rotor of 120°, i.e. this induced signal of substantially sinusoidal shape has an electrical frequency three times higher than the angular rotational frequency of the rotor expressed in revolutions per second.

In order to measure the rotational speed of the rotor, means 80 are provided for detecting the passage through zero of the signal induced in the stator windings. These means are formed in particular by a differential amplifier and a comparator. An output of means 80 supplies an almost instantaneous rotor rotational speed signal to a counter 82 and also to means 84 for regulating the rotational speed of the rotor. Counter 82 is connected to a time base 86, associated with a quartz 88, which thus allows an advance or retardation of the rotor relative to a pre-defined rotational speed to be determined.

Counter 82 is also connected to regulation means 84 which act on control means 90 in which are arranged switches 92 electrically activated by regulation means 84. Four switches 92 are provided so as to be able to give pulses of limited duration and negative or positive polarity. Switches 92 are electrically connected to a supply means 94, which can also be connected to regulation means 84 and to time base 86, in particular when chopped pulses are sent and the chopping rate is varied for purposes of regulating the angular velocity of the rotor and the voltage level according to whether one is in the phase for starting or maintaining the rotor's rotation, as will be explained hereinafter.

In order to determine in a certain and efficient manner the rotor's direction of rotation, means 96 are provided for detecting the direction of rotation of which three inputs are connected to the ends of the two windings 27 and 28. In order to increase the accuracy and reliability of detection by means 96, an alternative provides that inputs of said means 96 are also connected to the two terminals of third flat winding 26. The direction of rotation or the variation in said direction of rotation detected by means 96 is communicated to regulation means 84. A variation in the direction of rotation can occur in particular in the event of successive violent shocks undergone by the miniature motor. In such case, it is necessary to arrange the regulation means so as to stop operation of the miniature motor immediately, to restart in the correct direction and then to recover the number of revolutions missed relative to the reference rotational speed. In order to do this, counter 82 is used to calculate the retardation generated by such a situation. Those skilled in the art know how to arranged the various electronic modules shown in FIG. 3 to control the miniature motor according to the teaching provided herein.

Figure 4:
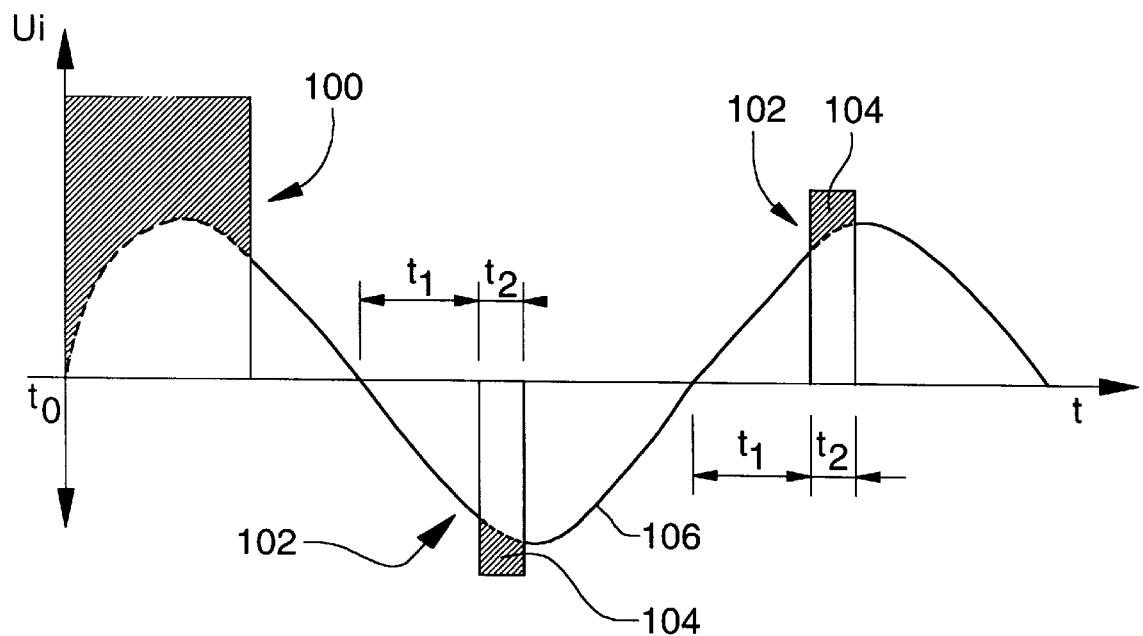
FIG. 4 shows a control method according to the invention for a continuous rotation miniature motor.

FIG. 4 shows schematically a preferred operating mode of the miniature motor according to the invention. For the implementation thereof, it will be noted that a permanent magnet 62 is provided at the periphery of the miniature motor used for positioning the rotor when it is stopped (FIG. 1). The direction of this bipolar magnet from axis of rotation 14 is offset angularly relative to the direction of the centre 64 of flat winding 27, also from this axis of rotation 14, by a non-zero value a. Preferably the value of a is less than 30°. When the miniature motor is stopped, the longitudinal axis 32 of the rotor is aligned with the direction of positioning magnet 62. This particular arrangement has the result that at time to the amplitude of the curve of induced voltage $U_i$ in windings 27 and 28 is not zero. Thus, in order to allow the rotor to start to move in rotation, an initial pulse 100 is provided by supply means 94 (FIG. 3) to the stator windings.

Starting pulse 100 is supplied by a relatively high voltage, in particular close or equal to the voltage of the energy source which is for example a battery or any kind of accumulator. Thus, starting pulse 100 brings a lot of energy to the rotor to allow it to reach substantially the required reference angular rotational speed. In an alternative, a single starting pulse is provided whereas in another alternative, it is possible to provide several starting pulses before the rotor reaches the reference angular velocity.

Once starting has finished, the rotation of the rotor is assured by means of maintenance pulses 102 which are provided by the supply means, controlled by the control means described in FIG. 3, when the magnetic coupling between the stator coils and the rotor magnets is close to the maximum. According to the invention, each electric maintenance pulse is however provided before the maximum coupling to allow self-regulation of the maintenance of the rotor's rotational speed, i.e. the average temporal value of this maintenance pulse is situated before the temporal value corresponding to the induced voltage in the half period concerned of the induction curve, as is shown in FIGS. 4 and 5.

The energy supplied to the miniature motor is defined by the surface 104 situated between induction curve 106 and the peak of pulse 102. When the rotational speed of the rotor decreases, induction curve 106 sees its period increase and the induction curve then corresponds to curve 106'. The peak of curve 106' moves away from pulse 102 so that surface 104 is increased by surface 104' and thus the energy supplied to the miniature motor increases automatically so that the rotational speed of the rotor again increases. Conversely, when the rotor's rotational speed increases, the energy supplied decreases as long as the average temporal value of pulse 102 remains less than the temporal value of the next peak (in absolute value) of the induction curve. It will be noted that the time interval $t_1$ between the passage through zero of induction curve 106 and the beginning of maintenance pulse 102 can be determined with a constant optimum value allowing self-regulation of a reference speed, to a certain extent.

Figure 5:
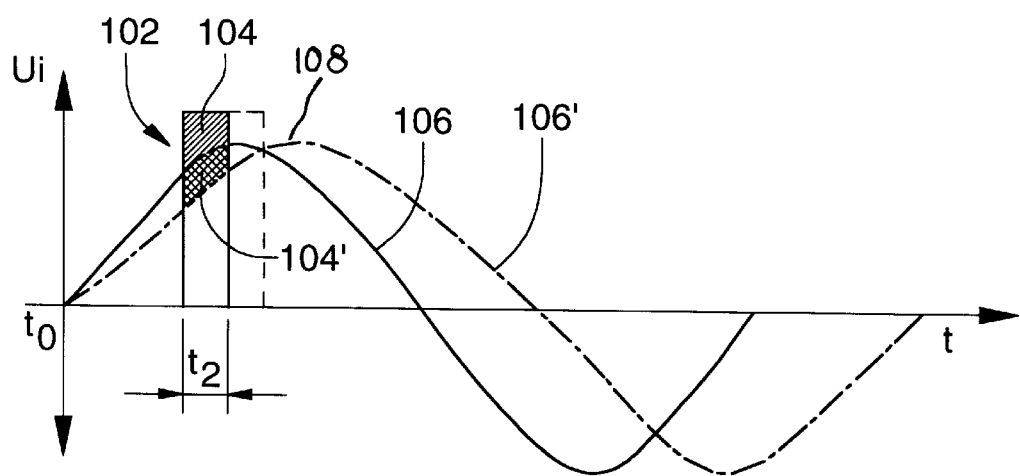
FIG. 5 shows schematically a self-regulating effect resulting from the control method according to the invention.

The duration $t_2$ of the maintenance pulse allows the quantity of energy supplied by each pulse 102 to the rotor to be determined, the value of $t_2$ being able to being fixed or variable, as is shown in FIG. 5. In order to vary the quantity of energy supplied so as to assure regulation of the rotor's rotational speed, the regulation means and the control means (FIG. 3) may also act on duration $t_2$ of pulse 102 or on the supply voltage, in particular by varying the chopping rate of maintenance pulses 102. It is also possible to vary the number of maintenance pulses 102 supplied to the stator coils and in particular not to supply maintenance pulses in certain half periods of the induction curve.

It will be noted that the voltage of starting pulse 100 is greater than the voltage of maintenance pulses 102 whose value is preferably close to the value of the maximum amplitude of induced voltage $U_i$ in order to minimise the electric energy consumption, as shown in FIGS. 4 and 5. Thus, supply means 94 (FIG. 3) are arranged so as to be able to supply the stator coils with a starting voltage and under a lower maintenance voltage.

Those skilled in the art will note that, as long as the control and supply means are arranged in an appropriate manner, it is possible to provide only one or two winding(s) for driving the rotor. However, in such a case, the electromechanical coupling between the rotor magnets and the stator winding has a lower amplitude.

It will be noted that it is possible to provide a magnetic sensor allowing the direction of rotation of the rotor to be determined and allowing accurate and efficient control of the miniature motor, in particular as regards the temporal positions of maintenance pulses 102 relative to the temporal maximum magnetic coupling positions between the rotor magnets and the stator coils.

What is claimed is:

1. A method for controlling a continuous rotation miniature motor for a time piece including a rotor carrying permanent magnets and a stator carrying at least one coil electrically connected to control and supply means, said permanent magnets being arranged radially on said rotor with respect to said at least one coil so that the rotation of said rotor generates in the coil a variable induced voltage defining an alternating induced voltage curve as a function of time, wherein the rotation of said rotor is maintained by temporally separated voltage pulses provided by said control and supply means said maintenance pulses being supplied in successive half periods of said induced voltage curve before the induced voltage reaches a maximum absolute value in each of said half periods.

2. A control method according to claim 1, wherein the time interval, between a passage through zero of the induced voltage curve, defining the beginning of any half period, and the beginning of a maintenance pulse, provided in said half period, is constant and determined so that this maintenance pulse occurs before the induced voltage has reached said maximum value in this half period, for a given reference rotational speed.

3. A method according to claim 1 or 2, wherein the duration of the maintenance pulses is substantially constant.

4. A method for controlling a continuous rotation miniature motor including a rotor carrying magnets and a stator carrying at least one coil electrically connected to control and supply means, said permanent magnets being arranged radially on said rotor with respect to said at least one coil so that the rotation of said rotor generates in the coil a variable induced voltage defining an alternating induced voltage curve as a function of time, wherein the rotation of said rotor is maintained by temporally separated voltage pulses provided by said control and supply means, said maintenance pulses being supplied in successive half periods of said induced voltage curve before the induced voltage reaches a maximum absolute value in each of said half periods, and wherein the duration of the maintenance pulses varies as a function of the load applied to said miniature motor or of a detected deviation between the angular position of the rotor and a reference angular position determined by said control and supply means.

5. A method for controlling a continuous rotation miniature motor including a rotor carrying permanent magnets and a stator carrying at least one coil electrically connected to control and supply means, said permanent magnets being arranged radially on said rotor with respect to said at least one coil so that the rotation of said rotor generates in the coil a variable induced voltage defining an alternating induced voltage curve as a function of time, wherein the rotation of said rotor is maintained by temporally separated voltage pulses provided by said control and supply means, said maintenance pulses being supplied in successive half periods of said induced voltage curve before the induced voltage reaches a maximum absolute value in each of said half periods, and wherein at least one starting pulse is provided for starting, and is supplied by a supply voltage greater than the voltage of the maintenance pulses which has an absolute value close to the maximum absolute value of said induced voltage.

6. The control method according to claim 4 or 5, wherein the time interval, between (1) a passage through zero of the induced voltage curve, defining the beginning of any half period, and (2) the beginning of a maintenance pulse provided in said half period, is constant and determined so that this maintenance pulse occurs before the induced voltage has reached said maximum value in this half period, for a given reference rotational speed.

* * * * *